(12) United States Patent
Wang et al.

(10) Patent No.: US 11,762,237 B2
(45) Date of Patent: Sep. 19, 2023

(54) BACKLIGHT LAMP PANEL, BACKLIGHT MODULE, AND LIQUID CRYSTAL DISPLAY

(71) Applicant: BOE Technology Group Co., Ltd., Beijing (CN)

(72) Inventors: Xin Wang, Beijing (CN); Deli Fang, Beijing (CN); Fan Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 43 days.

(21) Appl. No.: 17/627,119

(22) PCT Filed: Apr. 23, 2021

(86) PCT No.: PCT/CN2021/089403
§ 371 (c)(1),
(2) Date: Jan. 13, 2022

(87) PCT Pub. No.: WO2021/238533
PCT Pub. Date: Dec. 2, 2021

(65) Prior Publication Data
US 2022/0252939 A1    Aug. 11, 2022

(30) Foreign Application Priority Data
May 28, 2020   (CN) .......................... 202020939369.X

(51) Int. Cl.
*G02F 1/00*        (2006.01)
*G02F 1/13357*     (2006.01)
*G02F 1/1335*      (2006.01)

(52) U.S. Cl.
CPC .. *G02F 1/133608* (2013.01); *G02F 1/133603* (2013.01); *G02F 1/133612* (2021.01)

(58) Field of Classification Search
None
See application file for complete search history.

(56) References Cited

U.S. PATENT DOCUMENTS 11,211,365 B1 * 12/2021 Liu ...................... H01L 25/0753
2009/0086486 A1 * 4/2009 Hsieh ................... G02B 6/0068
362/240

(Continued)

FOREIGN PATENT DOCUMENTS

CN     101398148 A     4/2009
CN     102235624 A    11/2011
(Continued)

*Primary Examiner* — Gerald J Sufleta, II
(74) *Attorney, Agent, or Firm* — Ling Wu; Stephen Yang; Ling and Yang Intellectual Property

(57) ABSTRACT

Disclosed a backlight lamp panel, a backlight module and a liquid crystal display. The backlight lamp panel includes a substrate body and at least one light-emitting unit, wherein at least one side edge of the substrate body is disposed with at least one splicing tooth and at least one splicing groove for accommodating a splicing tooth on other substrate body, the splicing tooth and the splicing groove are alternately disposed; and at least one light-emitting unit is arranged on a first surface of the substrate body in a matrix, and disposed on the splicing tooth. The substrate body is divided into at least one sub-region, each sub-region includes the light-emitting unit of at least one splicing tooth, and brightness of each sub-region is independently adjusted. A bottom of the splicing groove has a larger size than a notch of the splicing groove.

20 Claims, 6 Drawing Sheets

(56) References Cited

U.S. PATENT DOCUMENTS

| | | | |
|---|---|---|---|
| 2010/0182767 | A1 | 7/2010 | Chen et al. |
| 2011/0241980 | A1 | 10/2011 | Lee et al. |
| 2011/0299298 | A1 | 12/2011 | Liang |
| 2015/0049497 | A1* | 2/2015 | Wang ........................ F21K 9/00 362/382 |
| 2015/0340345 | A1* | 11/2015 | Wang ................... H01L 33/483 257/88 |
| 2016/0076734 | A1 | 3/2016 | Chen et al. |
| 2020/0408980 | A1 | 12/2020 | Liu |

FOREIGN PATENT DOCUMENTS

| | | |
|---|---|---|
| CN | 202419372 U | 9/2012 |
| CN | 104765097 A | 7/2015 |
| CN | 206280750 U | 6/2017 |
| CN | 206930796 U | 1/2018 |
| CN | 107966825 A | 4/2018 |
| CN | 109239962 A | 1/2019 |
| CN | 110322787 A | 10/2019 |
| CN | 110716351 A | 1/2020 |
| CN | 210223358 U | 3/2020 |
| CN | 111123585 A | 5/2020 |
| CN | 210535227 U | 5/2020 |
| CN | 212460264 U | 2/2021 |
| TW | 201610513 A | 3/2016 |

\* cited by examiner

BACKLIGHT LAMP PANEL, BACKLIGHT MODULE, AND LIQUID CRYSTAL DISPLAY

CROSS-REFERENCE TO RELATED APPLICATIONS

The present application is a U.S. National Phase Entry of International Application PCT/CN2021/089403 having an international filing date of Apr. 23, 2021, which claims priority of Chinese Patent Application No. 202020939369.X, entitled "Backlight Lamp Panel, Backlight Module, and Liquid Crystal Display", filed to the CNIPA on May 28, 2020, the contents of which should be interpreted as being incorporated into the present application by reference.

TECHNICAL FIELD

Embodiments of the present disclosure relate to the technical field of electronic devices, in particular to a backlight lamp panel, a backlight module and a liquid crystal display.

BACKGROUND

With people's rising requirements on display effects of electronic devices, especially liquid crystal display (LCD) display devices, Mini LED backlight technology came into being. The Mini LED backlight technology utilizes tens of thousands of ultra-small size LED lamps, which can further make a dimming partition more detailed, have higher contrast, shorten a light mixing distance and reduce a thickness of a whole device. A Mini LED backlight in a large-size LCD display device is made by splicing several lamp panels.

However, during a splicing process of lamp panels, there will be a splicing gap between two adjacent lamp panels, which makes a pitch between two adjacent mini LEDs at the splicing gap larger, and a limited illumination range of mini LEDs is not sufficient to cover the splicing gap, resulting in shadows at the splicing gap and affecting subsequent display.

SUMMARY

The following is a summary of subject matters described in the present disclosure in detail. The summary is not intended to limit a scope of protection of the claims.

The present disclosure mainly provides following technical solutions.

An embodiment of the present disclosure provides a backlight lamp panel, including:

a substrate body, at least one side edge of which is provided with at least one splicing tooth and at least one splicing groove configured to accommodate a splicing tooth on another substrate body, wherein the at least one splicing tooth and the at least one splicing groove are alternately disposed; and at least one light-emitting unit arranged on a first surface of the substrate body in a matrix, and disposed on the at least one splicing tooth.

In an exemplary implementation, a distance between an edge of a splicing tooth and a light-emitting unit adjacent to the edge of the splicing tooth is a first distance, and the first distance is smaller than or equal to half of a distance between centers of adjacent light-emitting units disposed on the substrate body except on the splicing tooth.

In an exemplary implementation, a splicing tooth and a splicing groove adjacent to each other have equal sizes along a first direction, wherein the first direction is a direction away from the substrate body in a width direction or a length direction of the substrate body; and light-emitting units on adjacent splicing teeth are regularly arranged along the length or the width direction of the substrate body.

In an exemplary implementation, the splicing tooth and the splicing groove adjacent to each other have the equal or unequal sizes along a second direction, wherein the second direction is a direction perpendicular to the first direction; and number and arrangement of light-emitting units in the splicing tooth are the same as those of light-emitting units at a splicing groove on another substrate body matched with the splicing tooth.

In an exemplary implementation, two opposite edges of the substrate body both have the splicing teeth and the splicing grooves, and the splicing teeth on the two opposite edges are arranged in a staggered manner, and the splicing grooves on the two opposite edges are arranged in the staggered manner; or circumferential edges of the substrate body each have the splice tooth and the splicing groove, and splicing teeth on opposite edges of the substrate body are arranged in the staggered manner, and splicing grooves on the opposite edges of the substrate body are arranged in the staggered manner.

In an exemplary implementation, the substrate body is divided into at least one sub-region, each sub-region includes at least one light-emitting unit, and brightness of each sub-region is independently adjusted;

wherein the at least one sub-region includes a light-emitting unit on the at least one splicing tooth.

In an exemplary implementation, the at least one sub-region includes the light-emitting unit disposed on one splicing tooth and does not include light-emitting units disposed outside the one splicing tooth.

In an exemplary implementation, four light-emitting units are disposed in each splicing tooth.

In an exemplary implementation, the light-emitting unit in each splicing tooth receives a first driving current, and the first driving current is greater than a driving current of light-emitting units on the substrate body except on the splicing tooth.

In an exemplary implementation, each light-emitting unit is a submillimeter light-emitting diode.

In an exemplary implementation, a bottom of each splicing groove has a larger size than an opening of the splicing groove; and one end of the splicing tooth connected to the substrate body has a larger size than one end of the splicing tooth away from the substrate body, so that the splicing tooth is engaged and spliced with the splicing groove in adaption.

In another aspect, an embodiment of the present disclosure provides a backlight module, which includes at least two of any of the backlight panels described above, wherein the at least two backlight lamp panels are engaged and spliced with each other by the splicing teeth and the splicing grooves.

In another aspect, an embodiment of the present disclosure further provides a liquid crystal display, which includes any of the backlight modules described above.

Other aspects may be understood upon reading and understanding of the drawings and the detailed description.

DETAILED DESCRIPTION

Specific implementations of the present disclosure will be described further in detail below with reference to accompanying drawings and embodiments. The following embodiments serve to illustrate the present disclosure, but are not intended to limit the scope of the present disclosure. It is to be noted that the embodiments in the present disclosure and features in the embodiments may be combined with each other randomly if there is no conflict.

In the following description, different occurrences of "one embodiment" or "an embodiment" do not necessarily refer to the same embodiment. In addition, specific features, structures, or characteristics in one or more embodiments may be combined in any suitable form.

Embodiment

Figure 1:
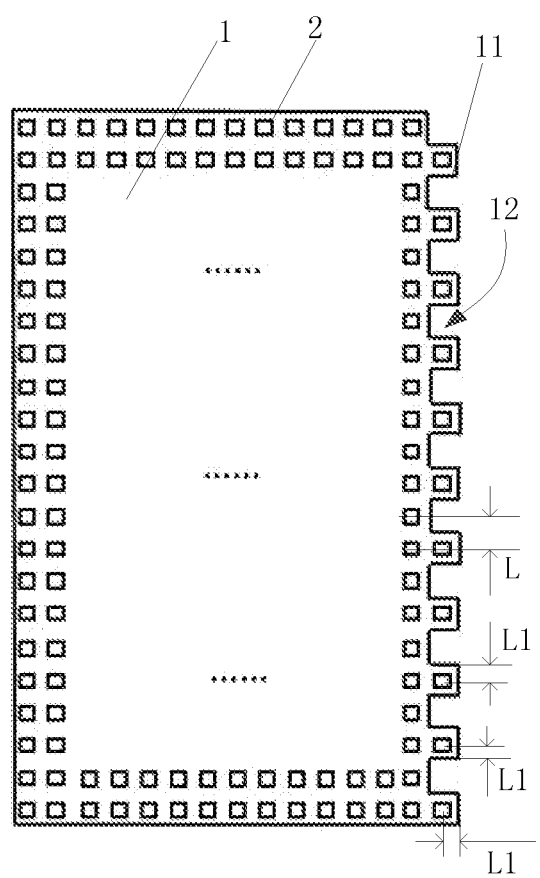
FIG. 1 is a schematic diagram of a structure of a backlight lamp panel according to an embodiment of the present disclosure.
Figure 5:
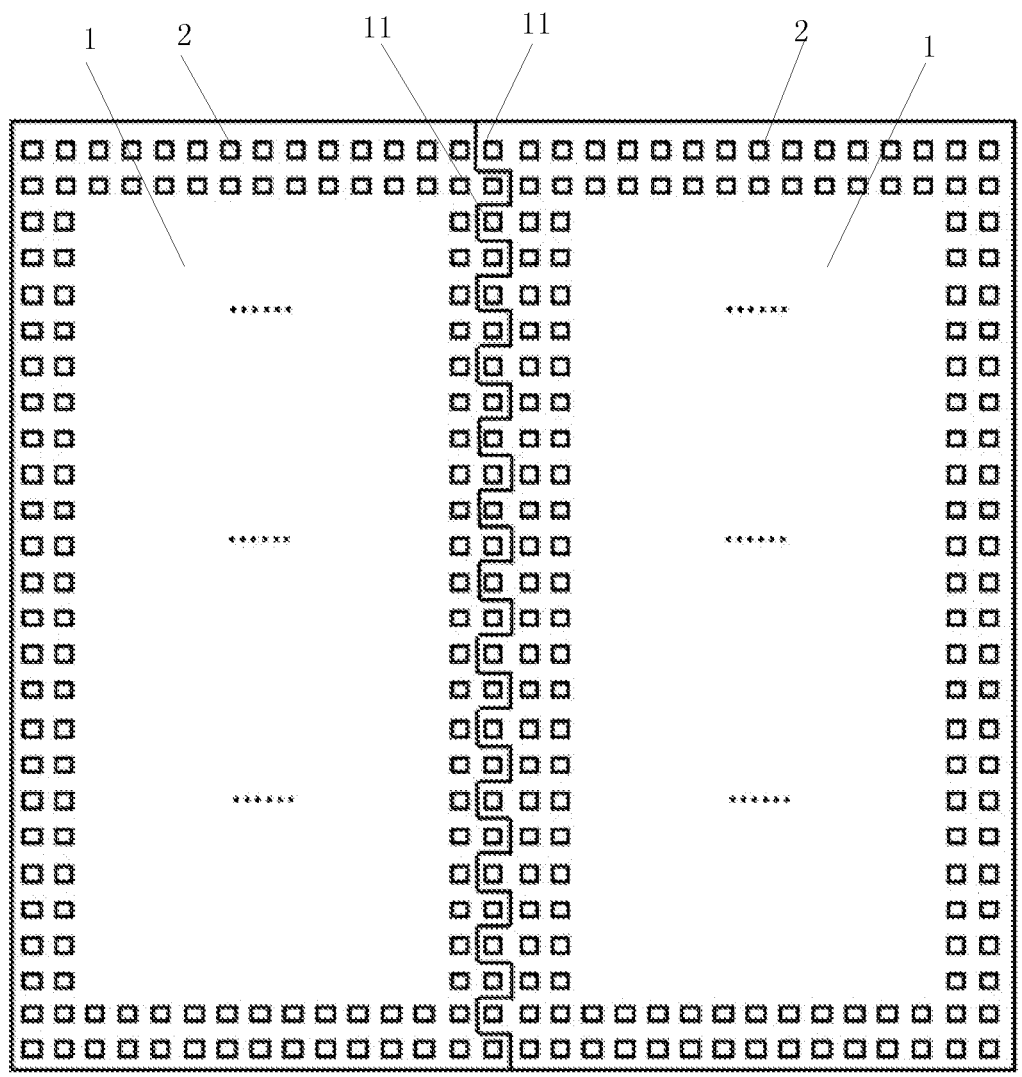
FIG. 5 is a schematic diagram of a structure of a spliced backlight lamp panel according to an embodiment of the present disclosure.

Referring to FIG. 1 and FIG. 5, the present disclosure provides a backlight lamp panel, which includes a substrate body 1 and at least one light-emitting unit 2. At least one side edge of the substrate body 1 is provided with at least one splicing tooth 11 and at least one splicing groove 12 for accommodating a splicing tooth 11 on another substrate body 1, and the at least one splicing tooth 11 and the at least one splicing groove 12 are alternately disposed. The at least one light-emitting unit 2 is arranged on a first surface of the substrate body 1 in a matrix, and at least one light-emitting unit 2 is disposed on the splicing tooth 11.

Among them, a distance between an edge of the splicing tooth 11 and a light-emitting unit 2 adjacent to the edge of the splicing tooth 11 is a first distance, wherein the first distance is smaller than or equal to half of a distance between adjacent light-emitting units 2 disposed on the substrate body 1 except on the splicing tooth 11.

In an exemplary implementation, the embodiment of the present disclosure provides a backlight lamp panel, which includes the substrate body 1 and at least one light-emitting unit 2. The at least one splicing tooth 11 and the at least one splicing groove 12 are alternately arranged on at least one side edge of the substrate body 1, so that it is ensured that there will be no segment difference (the segment difference is also a factor causing shadows) at a splicing gap during the splicing of adjacent backlight lamp panels. At least one light-emitting unit 2 is arranged on the splicing tooth 11, and it is ensured that a distance between the edge of the splicing tooth 11 and a center of the light-emitting unit 2 adjacent to the edge thereof is smaller than or equal to half of the distance between centers of adjacent light-emitting units 2 disposed on the substrate body 1 except on the splicing tooth 11, so that when two backlight lamp panel are spliced, the splicing tooth 11 on one backlight lamp panel can be engaged and spliced with a splicing groove 12 on the other backlight lamp panel mutually. It is ensured that the distance between the centers of two adjacent light-emitting units 2 at the splicing gap is smaller than or equal to the distance between the centers of the adjacent light-emitting units 2 disposed on the substrate body 1 except on the splicing tooth 11, so that when an adjacent substrate body 1 is spliced by the splicing tooth 11 and the splicing groove 12, the light-emitting units 2 at the splicing gap can effectively illuminate the splicing gap, and it will not cause a too large distance from the light-emitting unit 2 at the splicing gap to the splicing gap, thereby avoiding shadows at the splicing gap and ensuring the display effect.

Among them, the substrate body 1 is a Printed Circuit Board (PCB), wherein the substrate body 1 has a rectangular plate-like structure, provides a bearing surface for the light-emitting unit, and achieves an electrical connection between the light-emitting unit 2 and a driving apparatus. The Printed Circuit Board (PCB) is not difficult to understand or achieve for those skilled in the art, so it will not be repeated here. When the at least one splicing tooth 11 and the at least one splicing groove 12 are disposed on a side edge of the substrate body 1 in a length direction, multiple backlight lamp panels may be spliced in a direction parallel to their lengths into a larger lamp panel. When the at least one splicing tooth 11 and the at least one splicing groove 12 are disposed on a side edge of the substrate body 1 in a width direction, multiple backlight lamp panels may be spliced in a direction parallel to their widths into a larger lamp panel. If two backlight lamp panels are spliced with each other, only one side edge of each backlight lamp panel is provided with the splicing groove 12 and the splicing tooth 11. If multiple backlight lamp panels are spliced with each other along the direction of their lengths or widths, only one side edge of each of backlight lamp panels at two sides is provided with the splicing groove 12 and the splicing tooth 11, while both two opposite edges of each middle backlight lamp panel in-between are provided with the splicing groove 12 and the splicing tooth 11.

Figure 4:
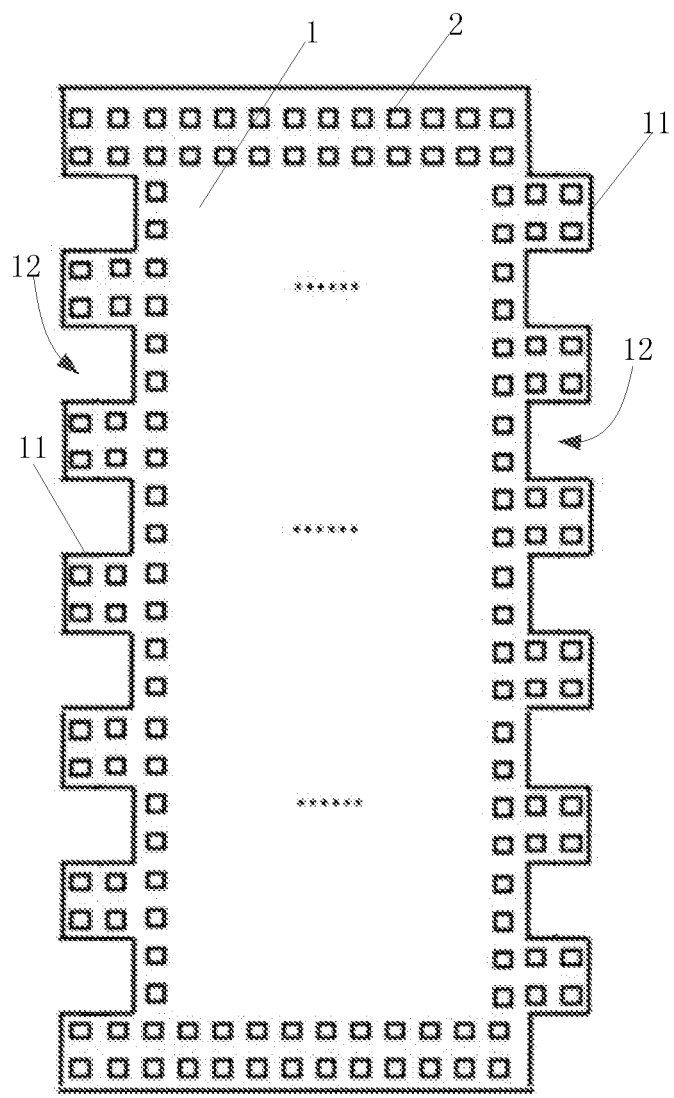
FIG. 4 is another still schematic diagram of a structure of a backlight lamp panel according to an embodiment of the present disclosure.

Among them, the light-emitting unit 2 is a mini LED lamp (a sub-millimeter LED), a size specification of the mini LED lamp is in the order of microns, wherein the at least one light-emitting unit 2 is arranged in a matrix on the substrate body 1, a distance L between the centers of adjacent light-emitting units 2 is in the order of millimeters, and the distance between adjacent light-emitting units 2 may be designed and adjusted according to actual requirements, which will not be repeated here. For example, when a distance L1 between the edge of the splicing tooth 11 and a center of the light-emitting unit 2 adjacent to its edge is smaller than or equal to the above-mentioned L/2, the light-emitting units 2 at a position where the splicing tooth 11 is engaged with the splicing groove 12, and other light-emitting units 2 form a whole matrix of the light-emitting units 2 when two adjacent backlight lamp panels are spliced, and a distance between centers of two adjacent light-emitting units 2 at the splicing gap is smaller than or equal to L. With the problem caused by the distance between the centers of the two adjacent light-emitting units 2 at the splicing gap being greater than L, the embodiments of the present disclosure may avoid occurrence of shadows according to the above-mentioned arrangement method. For example, the splicing tooth 11 has three edges. When one light-emitting unit 2 is disposed in the splicing tooth 11, referring to FIG. 1, a distance between a center of the light-emitting unit 2 in the splicing tooth 11 and each of the three edges of the splicing tooth should be smaller than or equal to L/2. when two light-emitting units 2 are disposed in the splicing tooth 11, referring to FIG. 2, a distance between a center of an upper light-emitting unit 2 in the splicing tooth 11 and each of upper and right edges of the splicing tooth 11 should be smaller than or equal to L/2, and a distance between a center of a lower light-emitting unit 2 and each of lower and right edges of the splicing tooth 11 should be smaller than or equal to L/2. When four light-emitting units 2 are disposed in the splicing tooth 11, referring to FIG. 4, a distance between a center of each of two left light-emitting units 2 in the splicing tooth 11 and upper/lower edge of the splicing tooth 11 is smaller than or equal to L/2, and a distance between a center of each of two right light-emitting units 2 and the upper/lower edge and right edge of the splicing tooth is smaller than or equal to L/2. Other settings are the same, which are not listed here.

Among them, each splicing tooth 11 is a protrusion disposed outward at the edge of the substrate body 1, and the splicing groove 12 is disposed at an interval between two adjacent splicing teeth 11, that is an accommodation space formed between them. Of course, with the alternate arrangement of the splicing teeth 11 and the splicing grooves 12, it may start with the splicing groove 12 and end with the splicing tooth 11 as shown in FIG. 1, or start with the splicing tooth 11 and end with the splicing groove 12. The alternate arrangement of the splicing tooth 11 and the splicing groove 12 will not be described in detail here, as long as adjacent backlight lamp panels can be correspondingly spliced by engagement and matching. Shapes of the splicing teeth 11 and the splicing grooves 12 are not too limited here, and may be regular or irregular, as long as the adjacent backlight lamp panels can be correspondingly spliced by engagement and matching.

Figure 6:
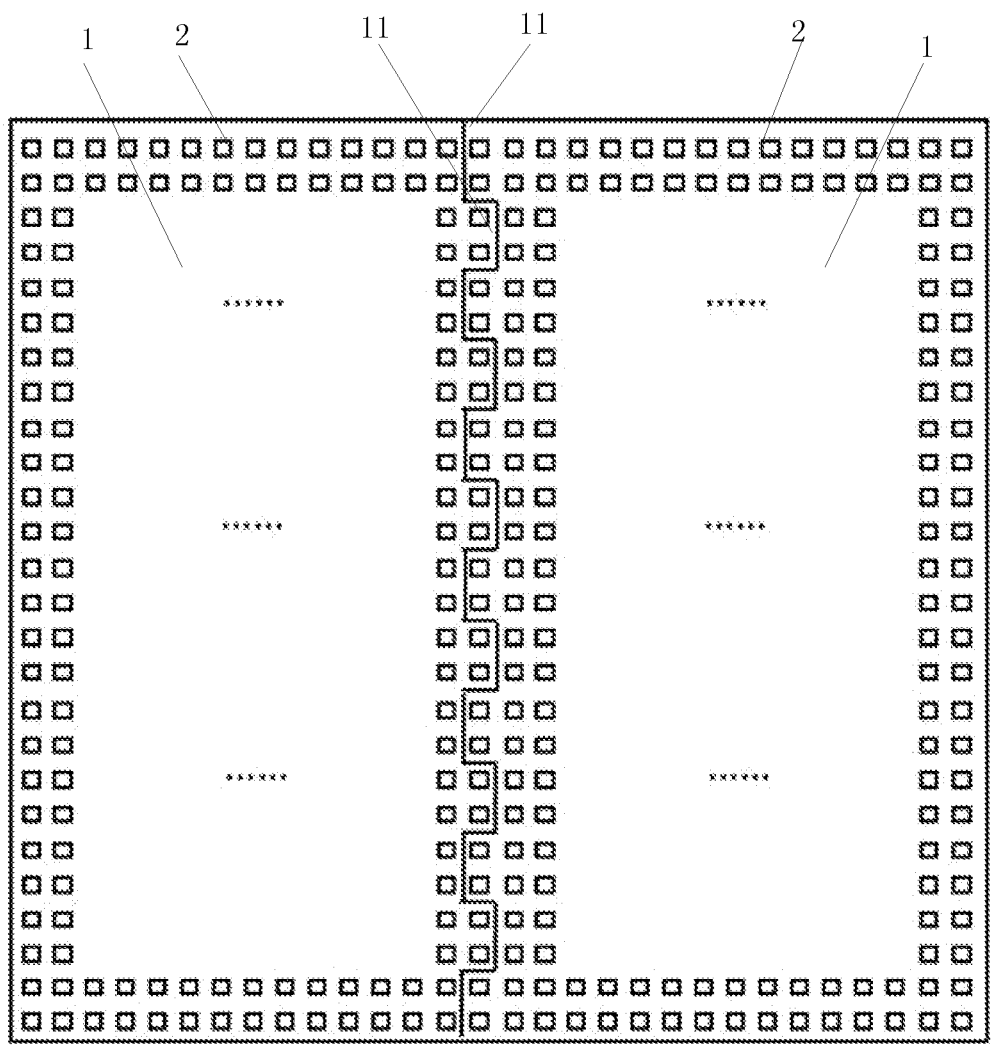
FIG. 6 is another schematic diagram of a structure of a spliced backlight lamp panel according to an embodiment of the present disclosure.

Among them, the number of the light-emitting units 2 disposed on the splicing tooth 11 may be adjusted according to actual design requirements. For example, referring to FIG. 6, two light-emitting units 2 are disposed on each splicing tooth 11, thus a form of two light-emitting units 2 in a column or two light-emitting units 2 in a row is formed. Here, it is necessary to ensure that the light-emitting units 2 in the splicing tooth 11 are arranged in a same form of row and column as other light-emitting units 2 except the light-emitting units 2 in the splicing tooth 11 disposed on the substrate body 1, and the light-emitting unit 2 and other light-emitting units 2 at the splicing gap form a whole matrix of light-emitting units after splicing of adjacent backlight lamp panels is completed.

According to what is listed above, in the backlight lamp panel of the present disclosure, at least one side edge of the substrate body 1 is provided in a form that the splicing teeth 11 and the splicing grooves 12 are alternately disposed, and light-emitting units 2 are disposed on the splicing tooth 11, and a distance between a light-emitting unit 2 adjacent to the edge of the splicing tooth 11 on the splicing tooth 11 and the edge of the splicing tooth 11 is set to be smaller than or equal to half of a distance between adjacent light-emitting units 2 disposed on the substrate body 1 except on the splicing tooth 11. Therefore, when adjacent substrate bodies 1 are spliced by the splicing tooth 11 and a splicing groove 12, a light-emitting unit 2 at the splicing gap can effectively illuminate the splicing gap, which will not cause a too large distance from the light-emitting unit 2 at the splicing gap to the splicing gap, thereby avoiding formation of shadows at the splicing gap and ensuring the display effect.

Herein, the term "and/or" is only an association relationship describing associated objects, which means that there may be three relationships, for example, A and/or B, which can be understood as: A and B may be included at the same time, A may exist alone or B may exist alone, and there may be any of the above three situations, wherein "inside" and "outside" refer to inside and outside in actual installation.

In an exemplary implementation, as shown in FIG. 1, an embodiment of the present disclosure provides a backlight lamp panel. In an exemplary implementation, the splicing teeth 11 and the splicing grooves 12 have equal sizes along a first direction, and the first direction is a direction away from the substrate body 1 in a width or length direction of the substrate body 1.

Light-emitting units 2 on adjacent splicing teeth 11 are regularly arranged along the length direction or the width direction of the substrate body 1.

In an exemplary implementation, in order to achieve that the light-emitting units 2 form a new integral matrix of light-emitting units 2 when the splicing teeth 11 and the splicing grooves 12 in two adjacent backlight lamp panels are matched with each other, in this embodiment, the splicing teeth 11 and the splicing grooves 12 are disposed to have the equal size along the first direction. For example, referring to FIG. 1, when the splicing teeth 11 and the splicing grooves 12 are disposed on one side edge of the backlight lamp panel in the width direction, that is, the right edge in FIG. 1, the splicing teeth 11 and the splicing grooves 12 have equal sizes along the length direction of the substrate body 1, so that when adjacent backlight lamp panels are spliced, splicing teeth 11 of the two backlight lamp panels have a same degree of indentation into the splicing grooves 12 of each other. It is ensured that adjacent splicing teeth 11 in the two backlight panels are regularly arranged along a width direction of the substrate body 1, that is, arranged at intervals on a straight line.

Figure 3:
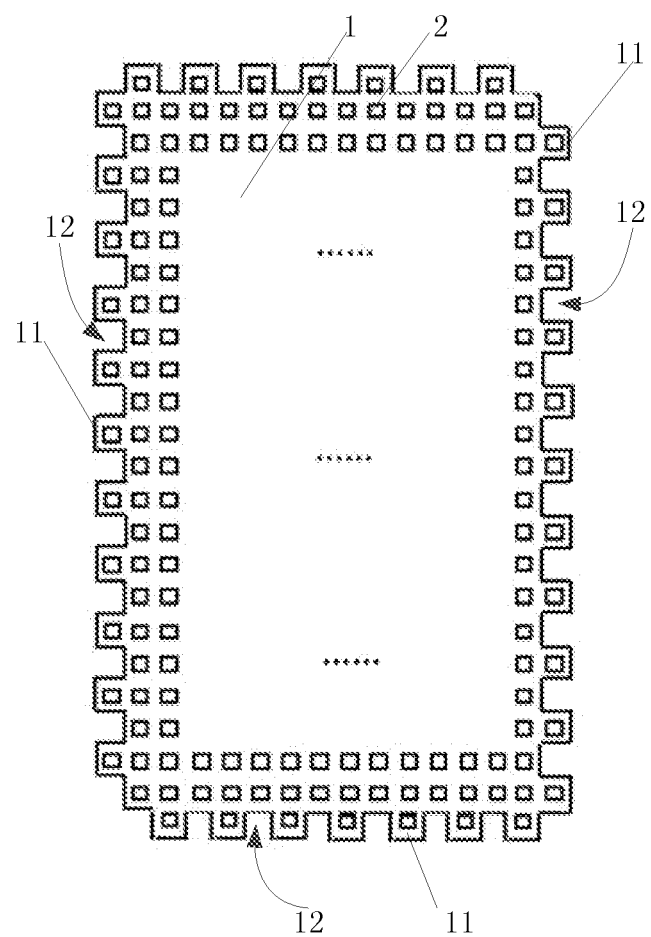
FIG. 3 is another yet schematic diagram of a structure of a backlight lamp panel according to an embodiment of the present disclosure.

In an exemplary implementation, as shown in FIG. 3, an embodiment of the present disclosure provides a backlight lamp panel. In the exemplary implementation, a splicing tooth 11 and a splicing groove 12 adjacent to each other have equal or unequal sizes along a second direction, wherein the second direction is a direction perpendicular to the first direction. The number and arrangement of the light-emitting units 2 in each splicing tooth 11 are the same as those of light-emitting units 2 at a splicing groove 12 on another substrate body 1 matched with the splicing tooth 11.

In an exemplary embodiment, in order to realize a diversity of the backlight lamp panel in the disclosed embodiment, in this embodiment, the splicing grooves 12 and the splicing teeth 11 may be set have equal or unequal sizes in the second direction, wherein the second direction is perpendicular to the first direction. For example, referring to FIG. 1, the splicing teeth 11 and the splicing grooves 12 have equal sizes in the first direction. That is, the splicing teeth 11 and the splicing grooves 12 have the same expansion and contraction sizes in the first direction in a leftward or rightward direction of the substrate body 1 in the figure, then the splicing teeth 11 and the splicing grooves 12 have the equal sizes in the second direction perpendicular to the first direction, that is, an upward or downward direction in the figure. Also referring to FIG. 3, it shows that the splicing teeth 11 and the splicing grooves 12 have unequal sizes, wherein whether the splicing teeth 11 and the splicing grooves 12 have the equal sizes in the second direction or not, it is necessary to ensure that the number and arrangement of the light-emitting units 2 on the splicing teeth 11 of one backlight lamp panel are the same as those of light-emitting units 2 at splicing grooves 12 of a corresponding backlight lamp panel. For example, referring to FIG. 1 and FIG. 2, when one light-emitting unit 2 is disposed in a splicing tooth 11, it is one row and one column. Then there is also one light-emitting unit 2 at a splicing groove 12 of the other backlight lamp panel corresponding to the backlight lamp panel (when the splicing tooth 11 and the splicing groove 12 have equal sizes in the second direction, the number and arrangement of the light-emitting unit 2 of the splicing tooth 11 are the same as those of the light-emitting units 2 at the splicing groove 12 adjacent to the splicing tooth 11), so as to ensure that when the two backlight lamp panels are spliced together, the light-emitting units 2 at the splicing gap and other light-emitting units 2 form an integral matrix of light-emitting units 2.

Figure 2:
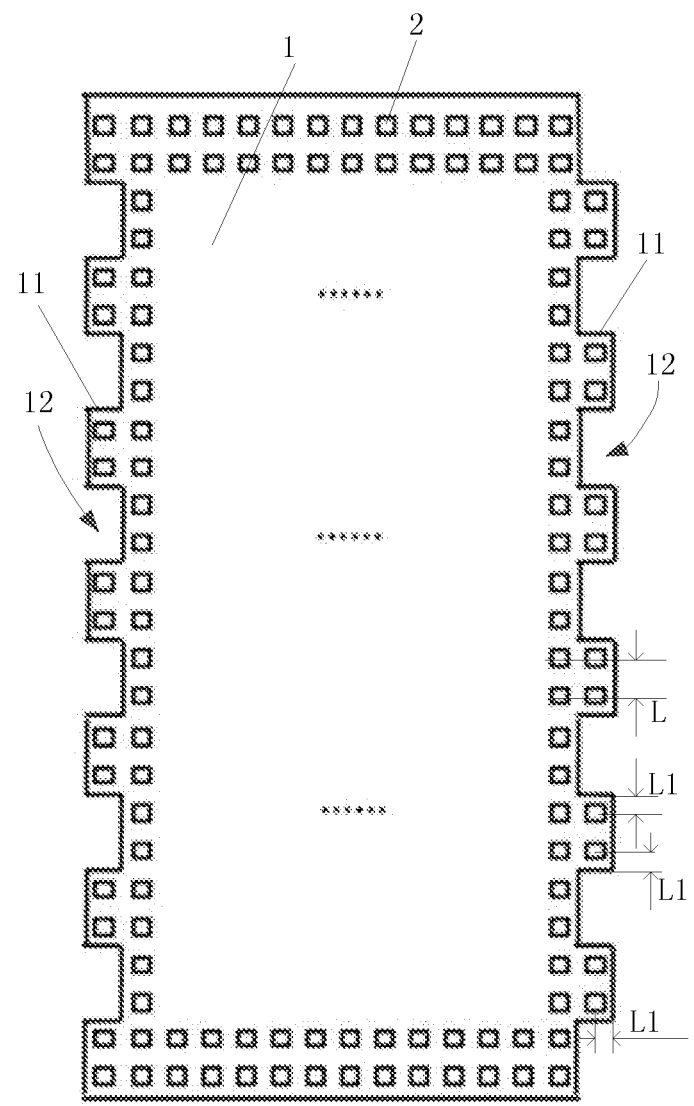
FIG. 2 is another schematic diagram of a structure of a backlight lamp panel according to an embodiment of the present disclosure.

In an exemplary implementation, referring to FIG. 2, an embodiment of the present disclosure provides a backlight lamp panel. In the exemplary implementation, two opposite edges of the substrate body 1 are provided with splicing teeth 11 and splicing grooves 12, wherein the splicing teeth 11 on the two edges are arranged in a staggered manner, and the splicing grooves 12 on the two edges are arranged in a staggered manner.

In an exemplary implementation, in order to achieve that the backlight lamp panel can be engaged and spliced with other backlight lamp panels at both sides in the same direction to form a large-size display, in this embodiment, the splicing grooves 12 and the splicing teeth 11 are disposed on two opposite edges of the substrate body 1. In order to ensure universality of a manufacturing template and manufacturing process of the backlight lamp panel, the splicing teeth 11 on the two opposite edges are arranged in the staggered manner, and the splicing grooves 12 on the two opposite edges are also arranged in the staggered. For example, in FIG. 2, a left edge of the substrate body 1 starts from a splicing tooth 11 and ends with a splicing groove 12 from top to bottom, while a right edge of the substrate body 1 starts from a splicing groove 12 and ends with a splicing tooth 11 from top to bottom in FIG. 2, so the edges of two sides of the backlight lamp panel with the same specification can be engaged and spliced with other backlight lamp panels with the same specification. If multiple backlight lamp panels are spliced with each other along a length or width direction thereof, only one side edge of each of backlight lamp panels at two sides is provided with the splicing grooves 12 and the splicing teeth 11, while two opposite side edges of each in-between backlight lamp panel are both disposed with the splicing grooves 12 and the splicing teeth 11.

In an exemplary implementation, referring to FIG. 3, an embodiment of the present disclosure provides a backlight lamp panel. In the exemplary implementation, circumferential edges of the substrate body 1 are each disposed with both the splicing teeth 11 and the splicing grooves 12, wherein splicing teeth 11 on opposite edges are arranged in a staggered manner and splicing grooves 12 on opposite edges are arranged in a staggered manner.

In an exemplary embodiment, in order to achieve that multiple backlight lamp panels are engaged and spliced with each other to form a large-size display, in this embodiment, the splicing teeth 11 and the splicing grooves 12 are arranged on the circumferential edge of the substrate body 1, that is, the splicing teeth 11 is disposed in a pairwise staggered manner on four edges of the PCB board, and the splicing groove 12 is arranged in the pairwise staggered manner. For detailed description, the above description may be referred to, which will not be repeated here. Furthermore, other backlight lamp panels can be spliced outwards at the same time in a circumferential direction of the same backlight lamp panel to form a large-size display. If multiple backlight lamp panels are spliced with each other, only one side edge of a backlight lamp panel at an edge is disposed with the splicing grooves 12 and the splicing teeth 11, and circumferential edges of each in-between backlight lamp panel is disposed with the splicing grooves 12 and the splicing teeth 11.

In an exemplary embodiment, an embodiment of the present disclosure provides a backlight lamp panel. In the exemplary implementation, the substrate body 1 is divided into at least one sub-region, wherein each sub-region includes at least one light-emitting unit 2, and brightness of each sub-region can be independently adjusted. The at least one sub-region includes the light-emitting unit 2 on at least one splicing tooth 11.

In an exemplary implementation, in order to achieve a purpose of higher brightness at the splicing gap between adjacent backlight lamp panels to prevent formation of shadows and of image quality enhancement, in this embodiment, the substrate body 1 is divided into at least one sub-region, wherein each sub-region includes at least one light-emitting unit 2, and partition control is performed on the light-emitting unit 2 on the at least one sub-region, and brightness of the light-emitting unit 2 on each sub-region is adjusted independently. The control mode is a region dimming mode, Local Dimming, and the brightness of the light-emitting unit 2 each of the at least one sub-region is respectively controlled by a driving apparatus, that is, an IC chip or a driving circuit, so as to achieve effects of energy saving and image quality enhancement. Such configuration is not difficult to be implemented or understood by those skilled in the art, so it will not be repeated here. The number of the light-emitting unit 2 in each sub-region may be adjusted according to actual requirements, such as 1, 4, 6, 9, etc. In this embodiment, the at least one sub-region includes the at least one light-emitting unit 2 on the splicing tooth 11, that is to say, one sub-region may separately include a light-emitting unit 2 on one splicing tooth 11, and may also include light-emitting units 2 on one splicing tooth 11 and on other regions.

In an exemplary implementation, at least one sub-region includes the light-emitting unit 2 disposed on one splicing tooth 11 and does not include light-emitting units 2 outside the splicing tooth 11, that is, when a sub-region only includes the light-emitting unit 2 on the one splicing tooth 11 and does not include light-emitting units 2 disposed on other regions, the light-emitting unit 2 on each splicing tooth 11 is individually controlled as a sub-region. When light-emitting is driven, a light-emitting unit 2 in each splicing tooth 11 receives a first driving current, which is greater than driving currents of other light-emitting units 2 on the substrate body 1 except on the splicing tooth 11, so as to ensure that brightness of the light-emitting unit 2 on the splicing tooth 11 is greater than that of other light-emitting units, and further ensure that no shadow will be formed at the splicing gap. For example, referring to FIG. 2, if two light-emitting units 2 are disposed in the splicing tooth 11, the two light-emitting units 2 in the splicing tooth 11 receive a same driving current with a large magnitude at the same time. For example, referring to FIG. 4, four light-emitting units are disposed in each splicing tooth 11 2, the four light-emitting units 2 in each splicing tooth 11 receive a same driving current with a large magnitude at the same time.

Alternatively, the light-emitting unit 2 in the splicing tooth 11 and a light-emitting unit 2 around a splicing groove 12 adjacent to the splicing tooth 11 are used as a sub-region, and the above light-emitting units 2 receive the first driving current, which is greater than driving currents of the light-emitting units 2 disposed on the substrate body 1 except on the splicing tooth 11, so as to ensure that the brightness of the light-emitting unit 2 on the splicing tooth 11 is greater than that of other light-emitting units, and further ensure that no shadow will be formed at the splicing gap. For example, referring to FIG. 1, if one light-emitting unit 2 is disposed in the splicing tooth 11 and there is one light-emitting unit 2 around the splicing groove 12 adjacent to the splicing tooth 11 is disposed with, the above two light-emitting units are electrically connected by a light-emitting unit 2 at a corner to form a 7-shaped arrangement, and the three light-emitting units 2 in the 7-shaped arrangement receive a same driving current with a large magnitude at the same time. How to electrically connect the light-emitting unit 2 in the splicing tooth 11 and the light-emitting units 2 around the splicing groove 12 is not too limited here, as long as the brightness of the light-emitting unit 2 at the splicing gap is ensured to be high.

Figure 7:
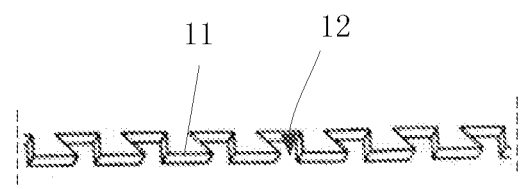
FIG. 7 is a schematic diagram of shapes of splicing teeth and splicing grooves in a backlight lamp panel according to an embodiment of the present disclosure.

In an exemplary implementation, referring to FIG. 7, an embodiment of the present disclosure provides a backlight lamp panel. In the exemplary implementation, a bottom of the splicing groove 12 has a larger size than that of an opening of the splicing groove 12.

An end of the splicing tooth 11 connected to the substrate body 1 has a larger size than that of an end of the splicing tooth 11 away from the substrate body 1, so that the splicing tooth 11 can be engaged and spliced with the splicing groove 12 in adaption.

In an exemplary implementation, in order to avoid a situation that multiple backlight lamp panels are moved after being engaged and spliced on a backboard, in this embodiment, the bottom of the splicing groove 12 is provided to have a larger size than the opening of the splicing groove 12, and correspondingly the splicing tooth 11 is provided to have a shape that is large at one end and small at the other end, so as to ensure that two adjacent substrate bodies 1 are snapped and limited with each other by the splicing teeth 11 and the splicing grooves 12 in a direction away from the substrate body 1 without occurrence of movement. For example, as shown in FIG. 7, the splicing groove 12 is a dovetail groove, and the splicing tooth 11 is a dovetail-shaped bump adapted with the dovetail groove. Alternatively, the splicing groove 12 is trapezoidal (circle, referring to a jigsaw shape), and the splicing tooth 11 is a trapezoidal (circle, referring to the jigsaw shape) bump opposite thereto. Of course, the shapes of the splicing tooth 11 and the splicing groove 12 may also be regular rectangles as shown in FIG. 1 to FIG. 5, which all belong to the scope of protection of the present disclosure, and the above-mentioned configuration with one end larger and the other end smaller is a preferred arrangement mode.

Another Embodiment

An embodiment of the present disclosure provides a backlight module, which includes at least two backlight lamp panels as described in the embodiment, and at least two backlight lamp panels are engaged and spliced with each other through splicing teeth and splicing grooves.

In an exemplary implementation, the backlight lamp panel in this embodiment may directly be selected as the backlight lamp panel described in the embodiment, and at least two backlight lamp panels are engaged and spliced with each other on a backboard and respectively fixed on the backboard. The fixation here may be bolt fixing or adhesive fixing, which is not difficult for those skilled in the art to achieve, which will not be repeated here. After the backlight lamp panel is fixed on the backboard, a side of the backlight lamp panel facing away from the backboard is covered by an optical film material. A point light source on the backlight lamp panel is presented in a form of full-surface light emission, and then a display screen is disposed on a side of the optical film material facing away from the backboard to form a complete backlight module. The arrangement of the optical film material and the display screen is not difficult for those skilled in the art to achieve, and will not be repeated here. A large-size backlight module may be formed by engaging and splicing of multiple backlight lamp panels on the backboard.

According to what is listed above, an embodiment of the present disclosure provides a backlight module, which includes at least two backlight lamp panels. In the two backlight lamp panels, splicing teeth 11 and splicing grooves 12 are alternately disposed on at least one side edge of the substrate body 1, so as to ensure that there will be no segment difference (segment difference is also a factor causing shadows) at a splicing gap between adjacent backlight lamp panels, and ensure that a distance between an edge of the splicing tooth 11 and a light-emitting unit 2 adjacent to the edge of the splicing tooth 11 is smaller than or equal to half of a distance between adjacent light-emitting units 2 on the substrate body 1 except on the splicing tooth 11, and realize that the distance between the two adjacent light-emitting units 2 at the splicing gap is smaller than or equal to half of the distance between the adjacent light-emitting units 2 disposed on the substrate body 1 except on the splicing tooth 11. Therefore, when the adjacent substrate bodies 1 are spliced by the splicing tooth 11 and the splicing groove 12, the light-emitting units 2 at the splicing gap can effectively illuminate the splicing gap, which will not cause a too large distance from the light-emitting unit 2 at the splicing gap to the splicing gap, thereby avoiding formation of shadows at the splicing gap and ensuring the display effect.

Another Embodiment

An embodiment of the present disclosure provides a liquid crystal display, which includes the backlight module described in another embodiment.

In an exemplary implementation, the backlight module in this embodiment is the backlight module described in another embodiment, which may be a large-size backlight module or an ultra-size backlight module, and the liquid crystal display in this embodiment may be a large-size liquid crystal display or an ultra-size liquid crystal display.

To sum up, the backlight lamp panel, the backlight module and the liquid crystal display according to the embodiments of the present disclosure at least have the following beneficial effects. In order to solve the problem that the backlight in the existing large-size LCD display is spliced by multiple lamp panels, and there is showdown at a splicing gap between adjacent lamp panels, which affects the display effect, at least one side edge of the substrate body of the backlight lamp panel in the present disclosure is configured in the form that the splicing teeth and the splicing grooves are alternately disposed, and the splicing teeth are provided with light-emitting units. A distance between a light-emitting unit adjacent to the edge of the splicing tooth and the edge of the splicing tooth is configured to be smaller than or equal to half of the distance between the adjacent light-emitting units on the substrate body except on the splicing tooth, so that when the adjacent substrate bodies are spliced with each other by the splicing teeth and the splicing grooves, the light-emitting unit at the splicing gap can effectively illuminate the splicing gap, which will not cause a too large distance from the light-emitting unit 2 at the splicing gap to the splicing gap, thereby avoiding the formation of shadows at the splicing gap and ensuring the display effect.

The above are merely preferred exemplary embodiments of the present disclosure, which are not intended to limit the present disclosure in any form. Any simple amendment, equivalent variation and modification made to the above embodiments according to the technical substance of the present disclosure shall be covered by the scope of the technical solutions of the present disclosure.

The invention claimed is:

1. A backlight lamp panel comprising:
a substrate body, at least one side edge of which is provided with at least one splicing tooth and at least one splicing groove configured to accommodate a splicing tooth on another substrate body, wherein the at least one splicing tooth and the at least one splicing groove are alternately disposed; and
at least one light-emitting unit arranged on a first surface of the substrate body in a matrix, and disposed on the at least one splicing tooth.

2. The backlight lamp panel of claim 1, wherein:
a distance between an edge of a splicing tooth and a light-emitting unit adjacent to the edge of the splicing tooth is a first distance, and the first distance is smaller than or equal to half of a distance between centers of adjacent light-emitting units disposed on the substrate body except on the splicing tooth.

3. The backlight lamp panel of claim 1, wherein:
a splicing tooth and a splicing groove adjacent to each other have equal sizes along a first direction, wherein the first direction is a direction away from the substrate body in a width direction or a length direction of the substrate body; and
light-emitting units on adjacent splicing teeth are regularly arranged along the length direction or the width direction of the substrate body.

4. The backlight lamp panel of claim 3, wherein:
the splicing tooth and the splicing groove adjacent to each other have the equal or unequal sizes along a second direction, wherein the second direction is a direction perpendicular to the first direction; and
number and arrangement of light-emitting units in the splicing tooth are the same as those of light-emitting units at a splicing groove on another substrate body matched with the splicing tooth.

5. The backlight lamp panel of claim 1, wherein:
two opposite edges of the substrate body both have the splicing teeth and the splicing grooves, and the splicing teeth on the two opposite edges are arranged in a staggered manner, and the splicing grooves on the two opposite edges are arranged in the staggered manner; or
circumferential edges of the substrate body each have the splice tooth and the splicing groove, and splicing teeth on opposite edges of the substrate body are arranged in the staggered manner, and splicing grooves on the opposite edges of the substrate body are arranged in the staggered manner.

6. The backlight lamp panel of claim 1, wherein:
the substrate body is divided into at least one sub-region, each sub-region comprises at least one light-emitting unit, and brightness of each sub-region is independently adjusted;
wherein the at least one sub-region comprises a light-emitting unit on at least one splicing tooth.

7. The backlight lamp panel of claim 6, wherein:
the at least one sub-region comprises the light-emitting unit disposed on one splicing tooth and does not comprise light-emitting units disposed outside the one splicing tooth.

8. The backlight lamp panel of claim 7, wherein:
four light-emitting units are disposed in each splicing tooth.

9. The backlight lamp panel of claim 7, wherein:
the light-emitting unit in each splicing tooth receives a first driving current, and the first driving current is greater than a driving current of light-emitting units on the substrate body except on the splicing tooth.

10. The backlight lamp panel of claim 1, wherein:
each light-emitting unit is a submillimeter light-emitting diode.

11. The backlight lamp panel of claim 1, wherein:
a bottom of each splicing groove has a larger size than an opening of the splicing groove; and
one end of the splicing tooth connected to the substrate body has a larger size than one end of the splicing tooth away from the substrate body, so that the splicing tooth is engaged and spliced with the splicing groove in adaption.

12. A backlight module, comprising:
at least two backlight lamp panels of claim 1; and
wherein the at least two backlight lamp panels are engaged and spliced with each other by the splicing teeth and the splicing grooves.

13. A liquid crystal display, comprising:
the backlight module of claim 12.

14. The backlight module of claim 12, wherein:
a distance between an edge of a splicing tooth and a light-emitting unit adjacent to the edge of the splicing tooth is a first distance, and the first distance is smaller than or equal to half of a distance between centers of adjacent light-emitting units disposed on the substrate body except on the splicing tooth.

15. The backlight module of claim 12, wherein:
a splicing tooth and a splicing groove adjacent to each other have equal sizes along a first direction, wherein the first direction is a direction away from the substrate body in a width direction or a length direction of the substrate body; and
light-emitting units on adjacent splicing teeth are regularly arranged along the length direction or the width direction of the substrate body.

16. The backlight module of claim 15, wherein:
the splicing tooth and the splicing groove adjacent to each other have the equal or unequal sizes along a second direction, wherein the second direction is a direction perpendicular to the first direction; and
number and arrangement of light-emitting units in the splicing tooth are the same as those of light-emitting units at a splicing groove on another substrate body matched with the splicing tooth.

17. The backlight module of claim 12, wherein:
two opposite edges of the substrate body both have the splicing teeth and the splicing grooves, and the splicing teeth on the two opposite edges are arranged in a staggered manner, and the splicing grooves on the two opposite edges are arranged in the staggered manner; or circumferential edges of the substrate body each have the splice tooth and the splicing groove, and splicing teeth on opposite edges of the substrate body are arranged in the staggered manner, and splicing grooves on the opposite edges of the substrate body are arranged in the staggered manner.

18. The backlight module of claim 12, wherein:

the substrate body is divided into at least one sub-region, each sub-region comprises at least one light-emitting unit, and brightness of each sub-region is independently adjusted;

wherein the at least one sub-region comprises a light-emitting unit on at least one splicing tooth.

19. The backlight module of claim 18, wherein:

the at least one sub-region comprises the light-emitting unit disposed on one splicing tooth and does not comprise light-emitting units disposed outside the one splicing tooth.

20. The backlight module of claim 19, wherein:

four light-emitting units are disposed in each splicing tooth.

* * * * *